United States Patent [19]

Owatari

[11] Patent Number: 4,849,773
[45] Date of Patent: Jul. 18, 1989

[54] INK JET RECORDING APPARATUS

[75] Inventor: Akio Owatari, Nagano, Japan

[73] Assignee: Seiko Epson Corporation, A Japanese Corporation, Tokyo, Japan

[21] Appl. No.: 92,106

[22] Filed: Sep. 2, 1987

[30] Foreign Application Priority Data

Sep. 5, 1986 [JP] Japan ................. 61-209317

[51] Int. Cl.$^4$ ........................... G01D 15/16
[52] U.S. Cl. ................ 346/140 R; 106/22
[58] Field of Search .............. 346/1.1, 140, 75; 106/22, 23, 20

[56] References Cited

U.S. PATENT DOCUMENTS

| | | | |
|---|---|---|---|
| 4,284,774 | 8/1981 | Buell | 106/22 X |
| 4,290,812 | 9/1981 | Loock | 106/22 |
| 4,373,954 | 2/1983 | Eida | 106/22 X |
| 4,668,789 | 5/1987 | Bermes | 546/101 |
| 4,683,002 | 7/1987 | Mirua | 106/22 X |
| 4,689,640 | 8/1987 | Shimomura | 346/140 |

FOREIGN PATENT DOCUMENTS

| | | |
|---|---|---|
| 2930491 | 2/1981 | Fed. Rep. of Germany . |
| 3117943 | 2/1982 | Fed. Rep. of Germany . |
| 3322502 | 6/1983 | Fed. Rep. of Germany . |
| 3344978 | 12/1983 | Fed. Rep. of Germany . |
| 3412426 | 10/1984 | Fed. Rep. of Germany . |
| 202358 | 6/1981 | Japan . |
| 222163 | 6/1982 | Japan . |

Primary Examiner—Joseph W. Hartary
Attorney, Agent, or Firm—Blum Kaplan

[57] ABSTRACT

A liquid ink composition having a sodium ion concentration between about 0.001 and 0.2% by weight or ink tank formed of resin or synthetic rubber containing between about 10 and 100 ppm of fatty acid or fatty acid derivatives is provided. The liquid composition is useful in every ink tank formed of resin or synthetic rubber containing fatty acid or the derivatives. The ink tank is also useful in despite of sodium ion concentration of ink. Formation of insoluble substances produced to react with sodium ion and fatty acid or the derivatives deteriorates the ink flow to clog the filter in the pass. The low sodium ion concentration of ink, or the low fatty acid or the derivatives concentrations of tank material prevents from forming the insoluble substances.

13 Claims, 1 Drawing Sheet

INK JET RECORDING APPARATUS

BACKGROUND OF THE INVENTION

This invention relates to liquid ink compositions for use in ink jet recording apparatus and, in particular, to a liquid ink composition having a reduced sodium ion concentration in order to prevent insoluble particles from leaching into the ink from ink pouches or tanks in which the ink is stored.

Conventional ink jet printers achieve quiet, high speed, high quality color printing using a variety of ink droplet ejection techniques including continuous ink jet ejection, impulse ink jet ejection, thermal ink jet ejection and the like. The techniques generally eject ink droplets from an extremely minute nozzle orifice having a diameter between about 10 and 100 μm. In order to pass through the minute nozzle orifice or ink flow path the ink must be clean and stable.

Ink is generally prepared in a clean room in order to minimize the introduction of dust particles. Alternately, the prepared ink is filtered through a membrane filter having a mesh size of 1 μm or less. In addition, tanks for storing ink are cleaned with ultrapure water using a precision cleaning process prior to being filled.

In conventional ink tank systems having a liquid ink stored therein, the ink is clean only when it is first introduced into the tank. After a period of time, at least in part due to changes in environment, including temperature, the composition of the ink deteriorates as a result of elution of material from the ink tank into the ink. This material reacts chemically with the ink composition to form insoluble substances and these insoluble substances clog the minute paths, filters, orifices, nozzles and the like of the ink jet printer. Consequently, ink flow is interrupted and print quality deteriorates resulting in a dot missing.

It is, therefore, desirable to provide an ink composition wherein insoluble substances are not produced when the ink is stored in an ink tank for an extended period of time.

SUMMARY OF THE INVENTION

Generally speaking, in accordance with the invention, a liquid ink composition having a sodium ion concentration between about 0.001 and 0.2% by weight is provided. The ink composition includes at least water, a soluble dye and a wetting agent. The liquid ink composition is particularly useful in ink tanks formed of resin or synthetic rubber containing between about 10 and 100 ppm of fatty acids or fatty acid derivatives. Formation of insoluble substances from the fatty acids or fatty acid derivatives in the ink tank is avoided as a result of the low sodium ion concentration of the ink.

Accordingly, it is an object of the invention to provide an ink composition wherein insoluble substances are not produced when the ink is maintained in an ink tank over an extended period of time.

Another object of the invention is to provide a liquid ink composition having a sodium ion concentration between about 0.001 and 0.2% by weight.

A further object of the invention is to provide an ink jet recording apparatus having a resin or synthetic rubber ink tank including a fatty acid or fatty acid derivative and having a liquid ink such that chemical changes due to leaching of material from the ink tank into the ink and formation of insoluble substances which would cause deterioration of print quality are prevented.

Still other objects and advantages of the invention will in part be obvious and will in part be apparent from the specification.

The invention accordingly comprises a composition of matter possessing the characteristics, properties, and the relation of components which will be exemplified in the composition hereinafter described, and the scope of the invention will be indicated in the claims.

DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1A:
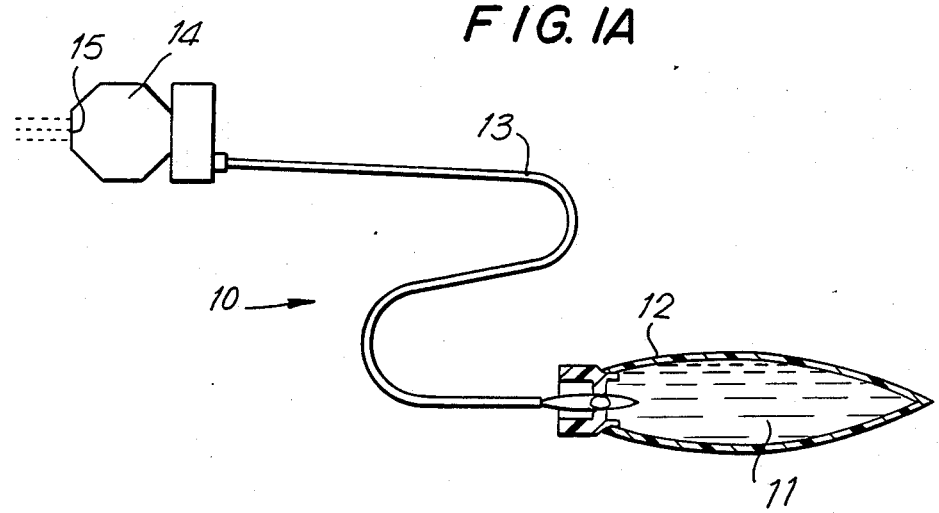
FIG. 1A is a partial cross-sectional elevational view of the ink supply system of an ink jet printer of the type used in accordance with the invention.
Figure 1B:
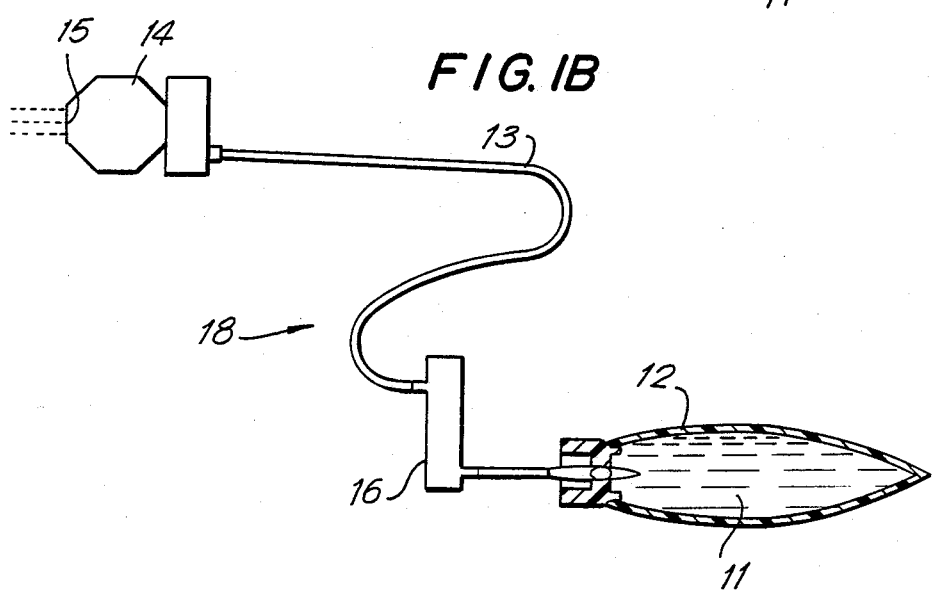
FIG. 1B is a partial cross-sectional elevational view of an alternate ink supply system of a typical ink jet printer.

FIG. 1A shows a typical ink supply system 10 of an ink jet recording apparatus. Ink supply system 10 contains an exchangable ink tank 12 having a liquid ink composition 11 contained therein. Ink composition 11 is supplied to a nozzle orifice 15 of a printhead 14 through an ink supply tube 13 connected at one end to ink tank 12 and at the other end to printhead 14. When ink supply tank 12 is empty, ink supply tank 12 is detached from ink supply tube 13 and replaced with a full ink tank 12. FIG. 1B shows an alternate ink supply system 18. Ink supply system 18 is the same as ink supply system 10 of FIG. 1A except that a filter 16 is provided in ink supply tube 13 to prevent foreign matter or insoluble particles such as dust from flowing to printhead 14. The use of filter 16 improves the reliability of ink supply system 18 over the reliability of ink supply system 10.

Figure 2:
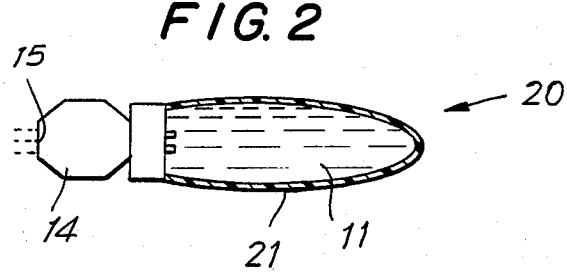
FIG. 2 is a partial cross-sectional elevational view of a further alternate ink supply system having an integrally formed printhead and ink tank.

FIG. 2 shows a further alternate ink supply system 20 wherein nozzle orifice 15 of printhead 14 is supplied directly with ink 11 from a unitary formed ink tank 21 having an ink composition 11 contained therein. This arrangement obviates the need for ink supply tube 13.

The portions of the ink supply system that come into direct contact with the ink must be made of materials that resist leaching into the ink composition. These ink contacting portions are preferably formed of resins such as polyolefin resin, polyvinyl chloride, polyvinylidene chloride, silicon resin, ethylene vinyl acetate copolymer, ABS resin, polyacetal, nylon, unsaturated polyester resin, polyethylene terephthalate (PET), aramid and the like or synthetic rubbers such as styrene butadiene rubber (SBR), butadiene rubber, chloroprene, nitryl rubber, butyl rubber, EPDM, urethane rubber, silicone rubber, acrylic rubber, epichlorohydrin rubber, fluorine rubber and the like. These resins and synthetic rubbers preferably contain appropriate amounts of assistants such as stabilizers, UV absorption agents and anti-oxidants in effective amounts for achieving their intended purposes.

In general, fatty acids or fatty acid derivatives contained in resins or synthetic rubbers used to form ink tanks are eluted into the ink composition and cause a chemical reaction that produces insoluble substances. Specifically, when ink tank 12 containing ink composition 11 was left standing for an extended period of time or was maintained at an elevated temperature, fatty acids or fatty acid derivatives contained in the resin or synthetic rubber of ink tank 12 were eluted into ink composition 11. When the temperature was reduced to normal room temperature, the eluted components separated from the ink and insoluble sodium salts were formed as a result of a chemical reaction between sodium ions in the ink and the fatty acids or fatty acid derivatives. These insoluble sodium salts clogged filter 16 and nozzle orifice 15 and interrupted ink flow.

Sodium stearate having thread-like or needle-shaped crystals is formed when the resin or synthetic rubber includes stearic acid, stearic acid amide or stearic acid salts as additives. The sodium stearate crystals cause filter 16 and any minute ink flow paths to clog and ink flow to be interrupted. This phenomenon was especially apparent when a resin or synthetic rubber ink tank having stearic acid additives was maintained at an elevated temperature of greater than about 40° C. for a period of greater than one day. This is presumably due to the fact that stearic acid, stearic acid amide and stearic acid salts are soluble at elevated temperatures. In addition, the polymer matrices of fat and synthetic rubber oscillate at a molecular level resulting in elution of the stearic acid and its derivatives into the ink. This phenomenon is even more noticeable when the pH of the ink is raised.

The type or grade of resin or synthetic rubber determines the amount of fatty acid and derivatives contained therein. In particular, polyolefin resins such as polyethylene and polypropylene are suitable for constructing ink tanks because they are resistant to chemical degradation, relatively inexpensive and easy to form in the shape of a bag. The fatty acid and derivatives are added as stabilizers when the resin is polymerized or as slip agents to prevent adhesion to a roller when the resin is formed as a film.

In general, the fatty acid and fatty acid derivatives used have between about 8 and 22 carbon atoms. Suitable fatty acids and fatty acid derivatives include stearic acid, stearic acid salts such as stearic acid calcium, stearic acid aluminum, stearic acid magnesium and stearic acid zinc (stearic acid (Ca, Al, Mg, Zn)), stearamide, behenic acid, behenic acid (Ca, Al, Mg, Zn), behenamide, oleic acid, oleic acid (Ca, Al, Mg, Zn), oleamide, erucic acid, erucic acid (Ca, Al, Mg, Zn), erucamide and the like. The type of polyethylene film depends on the degree of polymerization of the polyethylene and includes linear low density polyethylene (LLDPE), middle density polyethylene (MDPE) and high density polyethylene (HDPE). The amount of fatty acid and fatty acid derivative added depends on the polyethylene type. Ink tanks containing fatty acids and fatty acid derivatives can also be formed of vinyl chloride, nylon, polyacetal, ethylene vinyl acetate, ABS resin and nearly all synthetic rubbers.

Ink for ink jet printers must also be easy to handle in order to prevent clogging of the nozzle orifice due to drying. The ink preferably has a low viscosity so that it can be ejected as ink droplets from an ink jet head with high response speed. Water-based inks are generally used in ink jet printers and the compositions generally contain water-soluble dyestuff components such as direct dye, acid dye and basic dye as well as wetting components which prevent ink from drying when the water evaporates. Direct dyes usually contain a large amount of sulfonic acid sodium salt to increase their solubility in water. In addition, sodium chloride is used in salting-out processes, nitrous acid sodium salt is used in diazo processes and sodium acetate, sodium carbonate, sodium hydroxide and sodium sulfite are contained in the dye. As a result, sodium ions in the ink cause fatty acids and fatty acid derivatives contained in the ink tank material to be eluted into the ink as a result of temperature changes and the like. The eluted components cause formation of insoluble sodium salts of fatty acids and fatty acid derivatives which prevent ink flow.

Aqueous solutions having varied sodium ion concentrations and containing 1% potassium hydroxide (KOH) for the purpose of accelerating elution of fatty acids and fatty acid derivatives were poured into bags formed of low density polyethylene film, a commonly used polyolefin resin. The thickness of the polyethylene bags was 60 $\mu$m and the sodium ion concentrations were 0.1, 0.15, 0.2, 0.25 and 0.3% by weight of sodium ions respectively. The bags were heat sealed in a liquid to remove air bubbles and maintained for 10 days at a temperature of 70° C. Then the bags were maintained at room temperature for an additional 5 days and the products were observed. Thread-shaped crystals were observed in the bags containing 0.25 and 0.3% by weight sodium ion. Analysis of the solutions using an infrared spectrophotometer and X-ray microanalyzer showed that the thread-shaped crystals were sodium stearate. In the bags containing 0.1, 0.15 and 0.2% by weight of sodium ions, no thread-shaped crystals were observed. It can therefore be seen that even when fatty acids or fatty acid derivatives were contained in the resin or synthetic rubber forming the ink tank, insoluble sodium salts of the fatty acids or fatty acid derivatives which would prevent ink flow were not formed when the sodium ion concentration was 0.2% by weight or less.

When the sodium ion concentration in the ink was too low, dyes associated in solution and the ink was unstable when it was continuously ejected. Accordingly, the concentration of sodium ions in an ink containing primarily water, a water-soluble dye and a wetting agent should be between about 0.001 and 0.2% by weight. The sodium ion concentration can be decreased to this level by using ultrapure water which can be obtained by conventional methods such as treatment of tap water using a reverse osmosis film and an ion exchange resin.

In general, water-soluble dyes contain a heavy concentration of sodium ions. This is due to use of sodium chloride in salting-out processes, nitrous acid sodium salts in diazo processes and sodium acetate, sodium carbonate, sodium hydroxide and sodium sulfate in other processes. In addition, water-soluble dyes themselves can contain sulfonic acid sodium salts. Nearly all water-soluble dyes contain greater than about 5% sodium. The concentration of sodium ions can be reduced by reducing the use of sodium in manufacturing processes and replacing it with alkali metal compounds such as potassium chloride and the like. Additionally, even when sodium compounds are used, the number of sodium ions can be reduced by filtering the dye solution through a strong acid cation exchange resin deformed as an H-type such as Amberlite 120 series (manufactured by Orugano Kabushiki Kaisha), Dowex 50W (manufactured by Dow Chemical) and the like.

Direct dyes, acid dyes and basic dyes which appear in Color Index can be used as water-soluble dyes in the ink composition of the invention. The desired sodium ion concentration can be achieved by using a manufacturing method that uses a reduced amount of sodium or by purifying the ink composition after preparation. Since the dye serves as the coloring material of the recording ink, sufficient contrast must be maintained when the ink composition is printed on a printing medium. On the other hand, the nozzles of an ink jet head clog due to separation when water evaporates if the dye density is too high. Between about 0.5 and 10% by weight of dye is considered optimum.

A wetting agent is essential for preventing the ink from drying in the nozzle of an ink jet head. Wetting agents include soluble organic solvents such as polyhydric alcohols, ether derivatives and ester derivatives of polyhydric alcohols, water-soluble amines and cyclic compounds containing nitrogen. Specifically, polyhydric alcohols include ethylene glycol, diethylene glycol, triethylene glycol, propylene glycol, polyethylene glycol, glycerine, alkyl ether derivatives of polyhydric alcohols such as ethylene glycol monomethyl ether, diethylene glycol monomethylether, diethylene glycol monobutylether, diethylene glycol dimethylether, diethylene glycol methylethylether, triethylene glycol monomethylether and the like, ester derivatives of polyhydric alcohols such as ethylene glycol monoethylether acetate, diethylene glycol monomethylether acetate, glycerylmonoacetate, glycerdiacetate and the like, water-soluble amines such as monoethanol amine, diethanol amine, triethanol amine, polyoxyethyleneamine and the like and cyclic compounds containing nitrogen such as N-methyl-2-pyrolidone and the like.

None of these water-soluble organic solvents contain sodium ions so it is unnecessary to purify these solvents. However, purification should be carried out when water-soluble organic solvents which use sodium compounds in the elaboration process are used. The prevention of drying depends directly on the amount of organic solvent added. However, the organic solvent increases the viscosity of the ink and therefore it is not desirable to add too large an amount.

In general, the ink droplet ejection cycle is affected by the ink viscosity. When the ink viscosity is too high, the ejection cycle does not increase proportionately and ejection properties become unstable. An ink viscosity of 50 mPas or lower is desirable. This is accomplished by preparing a composition containing between about 5 and 80% by weight of water-soluble organic solvent.

The pH value of the recording ink is adjusted to between about 12 and 14 to accelerate the osmosis to recording paper. This is described in U.S. Pat. No. 4,352,691 of the named inventors herein. The earlier application discloses that alkali metal hydroxide can be used for increasing the pH value. However, it has now been determined that lithium hydroxide and potassium hydroxide are suitable but sodium hydroxide cannot be used.

Other ink additives such as antiseptics, mold inhibitors, chelating agents, pH adjusters and the like can be added as necessary. However, since many of these additives are sodium compounds, they should be added in very small amounts. It has also been shown that the production of insoluble substances was restrained even when more than about 0.2% by weight of sodium ions were contained in the ink when the amount of fatty acid and fatty acid derivatives in the resins and synthetic rubbers was reduced.

One hundred cubic centimeters of an aqueous sodium solution having a sodium ion concentration of 0.5% by weight in a 1% by weight KOH solution was poured into polyethylene bags containing 5 ppm, 10 ppm, 50 ppm, 100 ppm and 200 ppm of stearic acid calcium. Each bag was heat sealed in a liquid and maintained for 3 days at room temperature. Each solution was filtered through a metallic filter having a pore size of 10 μm. Insoluble substances were produced only in the bag of sodium chloride solution containing 200 ppm of stearic acid calcium. The bag containing the 5 ppm solution developed a leak along the heat seal. As can be seen, production of insoluble substances was prevented independent of the percent by weight of sodium ions when a polyethylene bag having a concentration of stearic acid calcium between about 10 and 100 ppm was used.

The invention will be better understood with reference to the following examples. These examples are presented for purposes of illustration only and are not intended to be construed in a limiting sense.

EXAMPLE 1

An aqueous dye solution containing 10% by weight of C.I. Direct Black 38 and 90% by weight of ultrapure water was prepared. 100 g of the aqueous dye solution was passed through an ion exchange column filled with an H-type strong acid cation exchange resin, Amberlite 120B, in order to remove sodium ions. A refined aqueous dye solution containing 10% by weight of C.I. Direct Black 38 was obtained. In the refined aqueous solution the sodium was substituted with hydrogen and the pH value was raised to pH 10 using a KOH solution. The following ink composition was prepared using this refined aqueous dye solution:

| Refined aqueous dye solution | 12% by weight |
|---|---|
| Glycerine | 20% by weight |
| Ultrapure water | 68% by weight |

Ion chromatography confirmed that the solution contained 0.1% by weight of sodium, 0.4% by weight of potassium and 0.5% by weight of chlorine.

The ink solution was filtered through a Milipore membrane filter and degased. 150 g was poured into an ink bag formed of a polyethylene film and heat sealed in a liquid to yield an ink tank. The ink tank was maintained at a temperature of 70° C. for 120 hours and then at room temperature for an additional 3 days. The ink tank was connected to an IP-130K ink jet printer made by Seiko Epson Kabushiki Kaisha having nylon filters with a pore size of 30 μm in the ink flow path. The filters were observed after 10 ink tanks had been used and they were not clogged.

COMPARATIVE EXAMPLE 1

A 10% aqueous dye solution containing 10% by weight of C.I. Direct Black 38 was prepared as described in Example 1 but was not passed through an ion exchange column and the pH was adjusted using the same amount of KOH solution. Then an ink having the ink composition of Example 1 was prepared using this aqueous dye solution. Ion chromatography confirmed that the solution contained 0.5% by weight sodium, 0.4% by weight of potassium and 0.5% by weight of chlorine.

An ink tank was prepared and maintained in the same manner as described in Example 1. The ink tank was used for printing and deterioration in print quality was observed when the third ink tank was used. Nearly all of the filters in the ink flow path were clogged. As a result of observation with an infrared spectrometer and an electron micrograph, it was confirmed that the filters were clogged with sodium stearate crystals. Ink could not flow due to the clogged filters and was not adequately supplied to the recording head which caused the observed deterioration in print quality.

EXAMPLE 2

C. I. Direct Black 154 was synthesized by coupling using a nitrous acid sodium salt and by a second method wherein a sodium containing compound was not used. The dye was separated using hydrochloric acid and was dissolved in a KOH solution. Then the following ink was prepared using a 10% aqueous solution of the dye solution:

| | |
|---|---|
| Aqueous solution containing 10% by weight of C.I. Direct Black 154 | 15% by weight |
| Polyethylene glycol #300 | 30% by weight |
| Ultrapure water | 55% by weight |

Ion chromatography confirmed that the solution contained 0.03% by weight sodium, 0.6% by weight potassium and 0.3% by weight chlorine. An evaluation was conducted as described in Example 1 and the filters in the ink flow path were not clogged. Good printing quality was observed.

EXAMPLE 3

Dyes of Examples 3-1 to 3-8 were reduced as described in Example 1 and 2 and were used for preparing the inks of Examples 3-1 and 3-8. For comparison, commercial dyes were prepared as inks 3-10 and 3-13. Sodium, potassium and chlorine were measured using ion chromatography. The following Table shows the ink compositions.

TABLE 1

| Example No | Composition | Wt % | Na+ | K+ | Cl− |
|---|---|---|---|---|---|
| 3-1 | C.I. Direct Black 154 | 2 | 0.18 | 0.7 | 0.5 |
| | Glycerine | 15 | | | |
| | Diethylene glycol | 5 | | | |
| | KOH | 1 | | | |
| | Ultrapure water | 77 | | | |
| 3-2 | C.I. Direct Yellow 86 | 3 | 0.2 | 0.2 | 0.8 |
| | Triethylene glycol | 28 | | | |
| | Ultrapure water | 68.99 | | | |
| | EDTA - 2 sodium | 0.01 | | | |
| 3-3 | C.I. Direct Blue | 2.5 | 0.15 | 0.3 | 0.4 |
| | Polyethylene glycol #400 | 12 | | | |
| | Ethylene glycol monomethylether | 3 | | | |
| | Ultrapure water | 82.3 | | | |
| | Proxel XL-2 (a mold inhibitor manufactured by Imperial Chemical Industries) | 0.2 | | | |
| 3-4 | C.I. Direct Red 39 | 2 | 0.05 | 0.2 | 0.4 |
| | Triethanol amine | 15 | | | |
| | Ultrapure water | 82.9 | | | |
| | Dehydro acetic acid sodium salt (a mold inhibitor) | 0.1 | | | |
| 3-5 | C.I. Acid Red 254 | 1.5 | 0.12 | 0.78 | 0.5 |
| | Glycerine | 12 | | | |
| | N—methyl-2-pyrolidone | 4 | | | |
| | KOH | 1 | | | |
| | Ultrapure water | 81.5 | | | |
| 3-6 | C.I. Acid Yellow 23 | 4 | 0.1 | 0.3 | 0.6 |
| | Glycerine | 20 | | | |

TABLE 1-continued

| | Composition | Wt % | Na+ | K+ | Cl− |
|---|---|---|---|---|---|
| | Polyethylene glycol #200 | 2 | | | |
| | Ultrapure water | 73.9 | | | |
| | Hokuside LX-2 (a mold inhibitor manufactured by Hokko-Kagaku) | 0.1 | | | |
| 3-7 | C.I. Basic Violet 10 | 2 | 0.16 | 0.3 | 0.8 |
| | Diethylene glycol | 10 | | | |
| | Ethylene glycol | 5 | | | |
| | Ultrapure water | 82.8 | | | |
| | EDTA-2 sodium | 0.1 | | | |
| | Proxel XL-2 | 0.1 | | | |
| 3-8 | C.I. Direct Black 75 | 3 | 0.1 | 0.4 | 0.6 |
| | Glycerine | 5 | | | |
| | Triethylene glycol monomethylether | 50 | | | |
| | Ultrapure water | 41 | | | |
| | KOH | 1 | | | |
| comparative Examples | | | | | |
| 3-10 | C.I. Direct Black 154 | 2 | 0.4 | 0.7 | 0.5 |
| | Glycerine | 15 | | | |
| | Diethylene glycol | 5 | | | |
| | KOH | 1 | | | |
| | Ultrapure water | 77 | | | |
| 3-11 | C.I. Acid Red 254 | 1.5 | 0.5 | 0 | 0.4 |
| | Glycerine | 12 | | | |
| | N—methyl-2-pyrolidone | 4 | | | |
| | KOH | 1 | | | |
| | Ultrapure water | 81.5 | | | |
| 3-12 | C.I. Acid Yellow 23 | 4 | 0.3 | 0 | 0.3 |
| | Glycerine | 20 | | | |
| | Polyethylene glycol #200 | 2 | | | |
| | Ultrapure water | 73.9 | | | |
| | Hokuside LX-2 (a mold inhibitor, manufactured by Hokko-Kagaku) | 0.1 | | | |
| 3-13 | C.I. Basic Violet 10 | 2 | 0.8 | 0 | 0.9 |
| | Diethylene glycol | 10 | | | |
| | Ethylene glycol | 5 | | | |
| | Ultrapure water | 82.8 | | | |
| | EDTA-2 sodium | 0.1 | | | |
| | Proxel XL-2 | 0.1 | | | |

The results of evaluation of these inks in the manner described in Example 1 is shown in Table 2.

TABLE 2

| Ink No. | Printing Test | Clogging of filter |
|---|---|---|
| 3-1 3-2 3-3 3-4 3-5 3-6 3-7 3-8 | Good print quality. Quality equal to that obtained when the first ink tank was used was obtained when the tenth tank was used. Printing conditions were stably maintained. | None |

| | Comparative Examples | | |
|---|---|---|---|
| | 3-10 | Inferior printing was observed when the 3rd ink tank was used | Yes |
| | 3-11 | Inferior printing was observed when the 3rd ink tank was used | Yes |
| | 3-12 | Inferior printing was observed when the 5th ink tank was used | Yes |
| | 3-13 | Inferior printing was observed when the 1st ink tank was used | Yes |

As shown in Table 2, no clogging was observed when the sodium ion concentration was 0.2% by weight or less. Clogging was not influenced by the potassium or chlorine ion concentration.

EXAMPLE 4

A test was conducted as described in Example 1 except that the ink tanks were replaced with tanks of material set forth in Table 3. The inks of Example 1 and of Comparative Example 1 were used and the results are also shown in Table III.

TABLE 3

| Material | Ink of Example 1 | Ink of Comparative Example 1 |
| --- | --- | --- |
| Polypropylene |  | X |
| Polyvinyl chloride |  | X |
| Nylon |  | X |
| NBR |  | X |
| Butyl rubber |  | X |

= Good printing was maintained through the 10th ink tank printing.
X = Inferior printing was observed before the 10th ink tank was used and the filter was clogged.

When inks having 0.2% by weight or less of sodium ions were used, the filters were not clogged. However, when the ink had a sodium ion concentration of 0.5% by weight, the filter was clogged irrespective of which tank was used.

EXAMPLE 5

The inks of Example 3-1 to 3-8 and Comparative Example 3-10 to 3-13 were poured into ink tanks of Examples 5-1 to 5-8 and Comparative Examples 5-10 to 5-13. Each of the tanks was sealed, maintained at a temperature of 70° C. for 10 days and then maintained at room temperature for an additional 3 days. Each ink tank was used in an IP-130K ink jet printer made by Seiko Epson Kabushiki Kaisha and having filters made of nylon mesh with an area of 3 cm$^2$ and mesh openings of 30 μm. Printing was carried out using all 150 cc of ink in each ink tank. Table 4 shows the materials used for the ink tanks and Table 5 shows the results of observation of the filter.

TABLE 4

| Ink Tank No. | Material of Ink Tank | Ink |
| --- | --- | --- |
| 5-1 | Film of a blend of LDPE and HDPE, having a thickness of 60um | 150cc of ink shown in Example 3-1 |
| 5-2 | Film of polyvinyl chloride, having a thickness of 30um | 150cc of ink shown in Example 3-2 |
| 5-3 | Molded case of nylon 12 | 150cc of ink shown in Example 3-3 |
| 5-4 | Ethylene vinyl acetate film | 150cc of ink shown in Example 3-4 |
| 5-5 | Molded case of polyacetal | 150cc of ink shown in Example 3-5 |
| 5-6 | Molded case of styrene butadiene rubber | 150cc of ink shown in Example 3-6 |
| 5-7 | Molded case of nitryl rubber | 150cc of ink shown in Example 3-7 |
| 5-8 | Molded case of EDPM | 150cc of ink shown in Example 3-8 |
| 5-10 | Material of 5-1 | 150cc of ink shown in Example 3-10 |
| 5-11 | Material of 5-5 | 150cc of ink shown in Example 3-11 |
| 5-12 | Material of 5-6 | 150cc of ink shown in Example 3-12 |
| 5-13 | Material of 5-7 | 150cc of ink shown in Example 3-13 |

TABLE 5

| Ink Tank No. | Condition of filter |
| --- | --- |
| 5-1 | There were no sticky substances in any filters |
| 5-2 | There were no sticky substances in any filters |
| 5-3 | There were no sticky substances in any filters |
| 5-4 | There were no sticky substances in any filters |
| 5-5 | There were no sticky substances in any filters |
| 5-6 | There were no sticky substances in any filters |
| 5-7 | There were no sticky substances in any filters |
| 5-8 | There were no sticky substances in any filters |
| 5-10 | The filter was clogged over the entire surface. |
| 5-11 | One-fifth of the surface of the filter was clogged. |
| 5-12 | The filter was clogged over the entire surface. |
| 5-13 | The filter was clogged over the entire surface. |

No clogging was observed in the filters when the ink tanks of Examples 5-1 to 5-8 were used. Any eluted components were small enough to pass through the filter, thereby eliminating difficulties due to filter clogging. When the ink tanks of Examples 5-10 to 5-13 were used, the filters were clogged with a filmy substance composed of an aggregation of fibers. In addition, print quality deteriorated. When an ink tank of the type used in Example 5-11 was used continuously, the entire filter became clogged and print quality deteriorated.

EXAMPLE 6

200 cc of ink having the following composition was prepared.

| | |
| --- | --- |
| C.I. Direct Black 154 | 3 wt % |
| Polyethylene glycol #400 | 20 wt % |
| Diethylene glycol | 10 wt % |
| Ultrapure water | 67 wt % |

The ink composition was poured into a polyethylene bag containing 50 ppm of a fatty acid series stabilizer and a fatty acid series slip agent. The bag was heat sealed in a liquid to remove air bubbles. The ink tank was maintained at a temperature of 70° C. for 10 days and then maintained at room temperature for an additional 3 days. The ink was used in an IP-130K ink jet printer made by Seiko Epson Kabushiki Kaisha and printing was carried out. The ink flow was not interrupted and when the nylon filter having a pore size of 30 μm used in the ink flow path of the printer was examined after 200 cc of ink was consumed, there was no clogging.

COMPARATIVE EXAMPLE 6

The ink of Example 6 was poured into a polyethylene bag having 500 ppm of a fatty acid series stabilizer and a fatty acid series slip agent and the test described in Example 6 was conducted. Filmy substances clogged the nylon filter and print quality deteriorated before 200 cc of ink was consumed. Analysis showed that the filmy substance was a mixture of erucamide and oleamide which appeared to be separated from the slip agent on the surface.

EXAMPLE 7

200 cc of ink having the following composition was prepared.

| | |
| --- | --- |
| C.I. Direct Black 154 | 2 wt % |
| Glycerin | 20 wt % |
| Triethylene glycol | 5 wt % |

| -continued | |
|---|---|
| Potassium hydroxide | 1 wt % |
| Ultrapure water | 72 wt % |

The ink composition was poured into a polyethylene bag containing 100 ppm of a fatty acid series stabilizer and a fatty acid series slip agent and was tested as described in Example 6. The filter was not clogged after 200 cc of ink had been consumed.

COMPARATIVE EXAMPLE 7

200 cc of the ink of Example 7 was poured into a polyethylene bag containing 200 ppm of a fatty acid series stabilizer and a slip agent and the test was conducted as described in Example 7. Filmy matter was clogged in the nylon filter having a pore size of 30 μm before 200 cc of the ink was consumed for printing and print quality deteriorated. Analysis showed that the primary component of the filmy matter was sodium stearate. In addition, the sodium stearate was assumed to be produced by a process wherein the stabilizer contained in the polyethylene eluted into the ink and reacted with sodium ions in the dye, C.I. Direct Black 154. As described, when an ink tank having an ink composition with a sodium ion concentration between about 0.001 and 0.2% by weight is maintained at an elevated temperature or for an extended period of time, fatty acid or fatty acid derivatives eluted into the ink which contained in the materials of the ink tank do not react with sodium ions in the ink to produce insoluble substances. In addition, when an ink tank contained 10 to 100 ppm of fatty acid or fatty acid derivatives in the tank material is maintained at an elevated temperature or for an extended period of time with ink, fatty acid or fatty acid derivatives do not elute into the ink and separate. As a result, the ink flows stably in the ink supply system of an ink jet recording apparatus and no deterioration of print quality or dot missing is observed. As a result, reliability of the ink jet recording apparatus is improved.

It will thus be seen that the objects set forth above, among those made apparent from the preceding description, are efficiently attained and, since certain changes may be made in the above composition without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. An ink jet recording apparatus comprising an ink tank having an acqueous liquid ink stored therein, the ink tank formed of a resin or synthetic rubber containing at least one fatty acid or fatty acid derivative in an amount between about 10 and 100 ppm and the ink is an aqueous ink having a sodium ion concentration between about 0.001 and 0.2% by weight.

2. An ink jet recording apparatus comprising an ink tank having an aqueous liquid ink with a sodium ion concentration between about 0.001 and 0.2% by weight stored therein wherein said ink tank is formed of a resin or synthetic rubber obtained by polymerizing the resin with a catalyst which has been neutralized by a fatty acid or fatty acid derivative which remains in the tank material in an amount less than the amount which causes formation of insoluble substances in the ink by reaction of the sodium ions present in the ink with the fatty acid or fatty acid derivative.

3. The ink jet recording apparatus of claim 2, wherein the resin or synthetic rubber is selected from the group consisting of polyolefin resin, polyvinyl chloride, polyvinylidene chloride, silicon resin, ethylene vinyl acetate copolymer, ABS resin, polyacetal, nylon, unsaturated polyester resin, polyethylene terephthalate, aramid, styrene butadiene rubber, butadiene rubber, chloroprene, nitryl rubber, butyl rubber, EPDM, urethane rubber, silicon rubber, acrylic rubber, ethylchlorohydrin rubber and fluorine rubber.

4. The ink jet recording apparatus of claim 2, wherein the fatty acid is selected from the group consisting of stearic acid, behenic acid, oleic acid and erucic acid.

5. The ink jet recording apparatus of claim 2, wherein the fatty acid derivative is selected from the group consisting of stearic acid (Ca, Al, Mg, Zn) salt, stearamide, behenic acid (Ca, Al, Mg, Zn) salt, behenamide, oleic acid (Ca, Al, Mg, Zn) salt, oleamide, erucic acid (Ca, Al, Mg, Zn) salt and erucamide.

6. The ink jet recording apparatus of claim 2, wherein the aqueous ink further includes a water-soluble dye and a wetting agent.

7. The ink jet recording apparatus of claim 6, wherein the water-soluble dye is present in an amount between abut 0.5 and 10% by weight.

8. The ink jet recording apparatus of claim 6, wherein the wetting agent is present in an amount between about 5 and 80% by weight.

9. The ink jet recording apparatus of claim 6, wherein the dye is selected from a direct dye, an acid dye and a basic dye.

10. An ink jet recording apparatus comprising an ink tank having a liquid ink stored therein, said ink tank sealed by the application of heat and formed of a resin or synthetic rubber containing between about 10 and 100 ppm of at least one fatty acid or fatty acid derivative.

11. The ink jet recording apparatus of 10, wherein the resin is polyethylene.

12. The ink jet recording apparatus of 10, wherein the fatty acid or fatty acid derivative is stearic acid calcium.

13. An ink jet recording apparatus comprising an ink tank formed of a resin or synthetic rubber containing at least one fatty acid or fatty acid derivative, the tank suitable for storing an aqueous ink having a sodium ion concentration between about 0.001 and 0.2% by weight and the fatty acid or fatty acid derivative is present in an effective amount for preventing the formation of insoluble substances from the reaction of sodium ions in the ink with the fatty acid or fatty acid derivative.

* * * * *